(12) United States Patent
Yamamoto et al.

(10) Patent No.: US 9,333,846 B2
(45) Date of Patent: May 10, 2016

(54) UTILITY VEHICLE

(71) Applicant: KAWASAKI JUKOGYO KABUSHIKI KAISHA, Hyogo (JP)

(72) Inventors: Teruaki Yamamoto, Kakogawa (JP); Kazuhiro Maeda, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 24 days.

(21) Appl. No.: 14/073,081

(22) Filed: Nov. 6, 2013

(65) Prior Publication Data

US 2015/0122573 A1    May 7, 2015

(51) Int. Cl.
  *B62D 25/20*    (2006.01)
  *B60K 5/00*    (2006.01)
  *B62D 23/00*    (2006.01)
  *B60R 13/08*    (2006.01)
  *B60K 5/04*    (2006.01)

(52) U.S. Cl.
  CPC ............... *B60K 5/00* (2013.01); *B60R 13/0861* (2013.01); *B62D 23/005* (2013.01); *B60K 5/04* (2013.01); *B60K 2005/003* (2013.01)

(58) Field of Classification Search
  CPC ............... B62D 25/20; B62D 25/2009; B62D 25/2018; B62D 25/2027; B62D 25/2036; B62D 35/02
  USPC ........................................................ 180/69.1
  See application file for complete search history.

(56) References Cited

U.S. PATENT DOCUMENTS

| 3,110,518 | A  | * | 11/1963 | Wessells ........................ 296/204 |
| 6,994,388 | B2 |   | 2/2006  | Saito et al. |
| 2002/0050413 | A1 | * | 5/2002 | Renault ......................... 180/69.1 |

* cited by examiner

*Primary Examiner* — Bryan Evans
(74) *Attorney, Agent, or Firm* — Wenderoth, Lind & Ponack, L.L.P.

(57) ABSTRACT

A utility vehicle has a body frame, a source of power arranged in the body frame, and an under cover for covering a lower surface of the body frame. Both ends of the under cover in the vehicle width direction or the vehicle front and rear direction are fixed to lower surfaces of a plurality of bottom frame members forming a bottom part of the body frame, and a region of the under cover facing the source of power from the lower side is raised upward. A vertically sectional shape of the raised and designated region is formed in for example an arch shape.

7 Claims, 6 Drawing Sheets

UTILITY VEHICLE

BACKGROUND OF THE INVENTION

1. Field of the Invention

The present invention relates to a utility vehicle.

2. Description of the Prior Art

In a utility, generally, a source of power such as an engine, an electric motor, or the like is mounted in a body frame, and further, in order not to bring a scattering matter from the lower side or the uneven ground into contact with the source of power or the like, an under cover is attached to a lower surface of the body frame.

The entire surface of the conventional under cover is formed by a substantially planar plate material, and fixed to lower surfaces of bottom frame members of the body frame in a substantially horizontal state by fastening members such as tapping screws or bolts.

However, when a temperature of the under cover is increased by radiation heat of the source of power during running, the under cover is expanded and softened, so as to be brought into a sagging state. When running in a state that the under cover is sagging, there is a possibility that the under cover is rubbed by the uneven ground, so as to cause damage to the under cover itself. It should be noted that U.S. Pat. No. 6,994,388 is a conventional art of the utility vehicle.

SUMMARY OF THE INVENTION

The present invention is achieved in consideration with the above problem, and an object thereof is to provide a utility vehicle in which even when an under cover is thermally expanded and softened, the under cover can maintain a lowest height from the ground and avoid contact with the uneven ground.

In order to solve the problem, the present invention is a utility vehicle having a body frame, a source of power arranged in the body frame, and an under cover for covering a lower surface of the body frame, wherein both ends of the under cover in the vehicle width direction or the vehicle front and rear direction are fixed to lower surfaces of a plurality of bottom frame members forming a bottom part of the body frame, and a region of the under cover facing the source of power from the lower side is raised upward.

According to the present invention, even when the under cover is expanded and softened by radiation heat of the source of power such as an engine, the under cover is expanded so as to protrude upward. Thus, the lowest height from the ground is maintained, and contact with an uneven road surface or the like during running can be avoided.

In the present invention, in the above utility vehicle, a shape of the raised region may be formed as follows.

(a) The raised region has a vertically sectional shape along the vehicle width direction formed in an arch shape.

(b) The raised region has a vertically sectional shape along the vehicle front and rear direction formed in an arch shape.

(c) The raised region has vertically sectional shapes along the vehicle width direction and the vehicle front and rear direction both formed in an arch shape.

(d) The raised region is formed in a partially spherical shape.

(e) The raised region is formed in a circular shape or an oblong shape when seen from the upper side.

In a case where any shape of the above (a) to (e) is adopted, and in a case where the under cover is thermally expanded, the under cover is entirely uniformly and smoothly expanded (deformed) upward. Thus, durability is improved.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

Embodiment of the Present Invention

Based on FIGS. 1 to 8, a utility vehicle according to an embodiment of the present invention will be described. It should be noted that for convenience of the description, the forward direction of a vehicle will be referred to as the "front side" of the vehicle and parts, and the lateral direction seen from a passenger will be referred to as the "lateral direction" of the vehicle and the parts.

Figure 1:
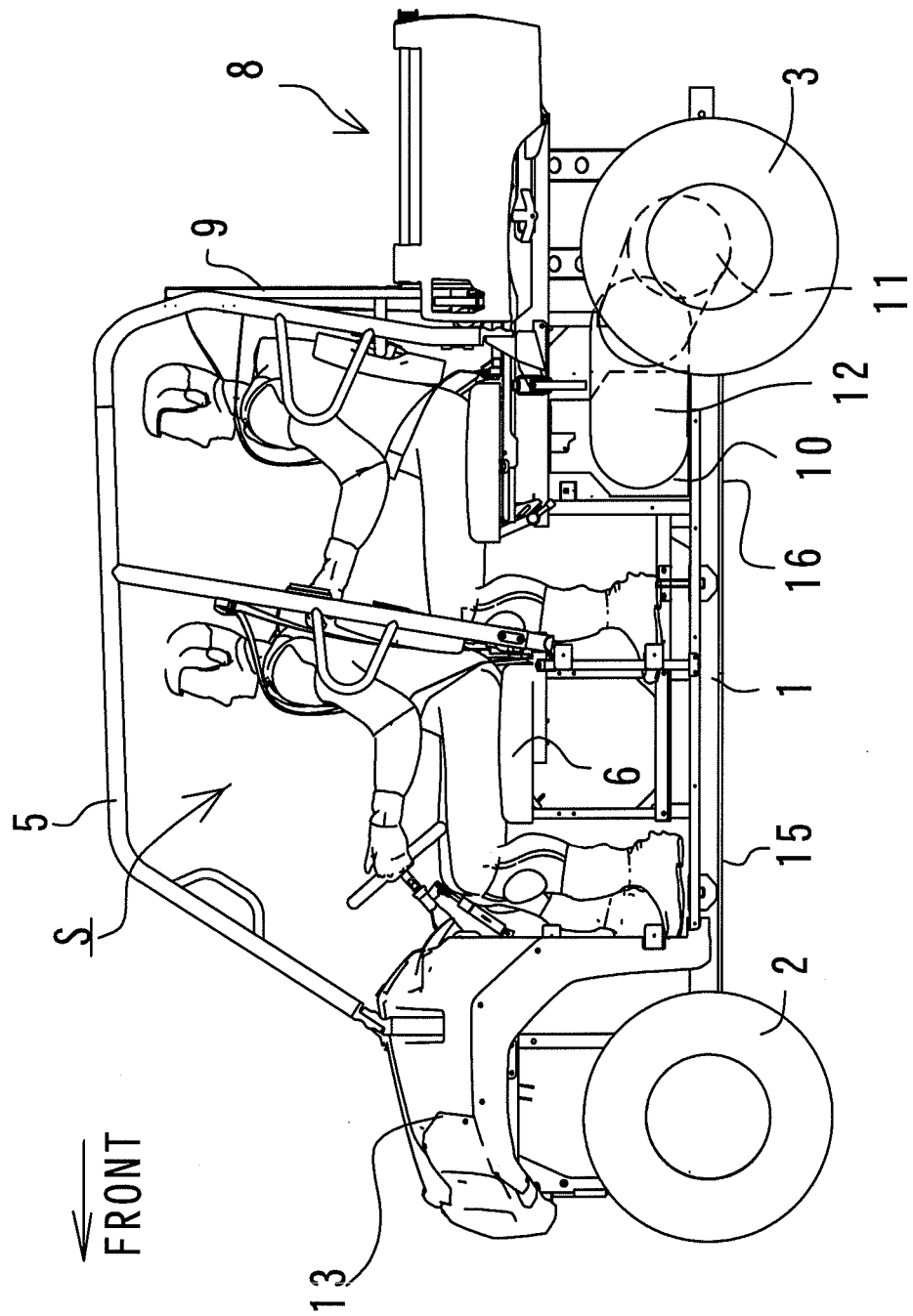
FIG. 1 is a left side view of one embodiment of a utility vehicle according to the present invention.

In FIG. 1, a pair of left and right front wheels 2 is provided in a front part of a body frame 1 of the utility vehicle, and a pair of left and right rear wheels 3 is provided in a rear part of the body frame 1. A riding space (passenger space) S between the front wheels 2 and the rear wheels 3 is surrounded by a ROPS 5, and the ROPS 5 is an abbreviation of a rollover protective structure. A three-seater front seat 6 is arranged in a front half part of the riding space S, a three-seater rear seat 7 is arranged in a rear half part of the riding space S, and a cargo bed 8 is provided behind the rear seat 7. A screen 9 is arranged between the rear seat 7 and the cargo bed 8. A bonnet 13 is provided on the front side of the riding space S.

In the utility vehicle, an engine (internal combustion engine) 10 is mounted in the body frame 1 as a source of power, and the engine 10 is arranged on the lower side of the rear seat 7 and supported by the body frame 1. A gear type transmission 11 is arranged behind the engine 10, and an input shaft of this gear type transmission 11 is coupled to a crankshaft of the engine 10 by a V-belt continuously variable transmission 12. The V-belt continuously variable transmission 12 is attached ranging from a left side surface of the engine 10 to a left side surface of a front part of the gear type transmission 11. On a lower surface of the body frame 1, a front under cover 15 and a rear under cover 16 are attached so as to cover a region ranging from a front end of the riding space S to a lower position of the engine 10 from the lower side.

Figure 2:
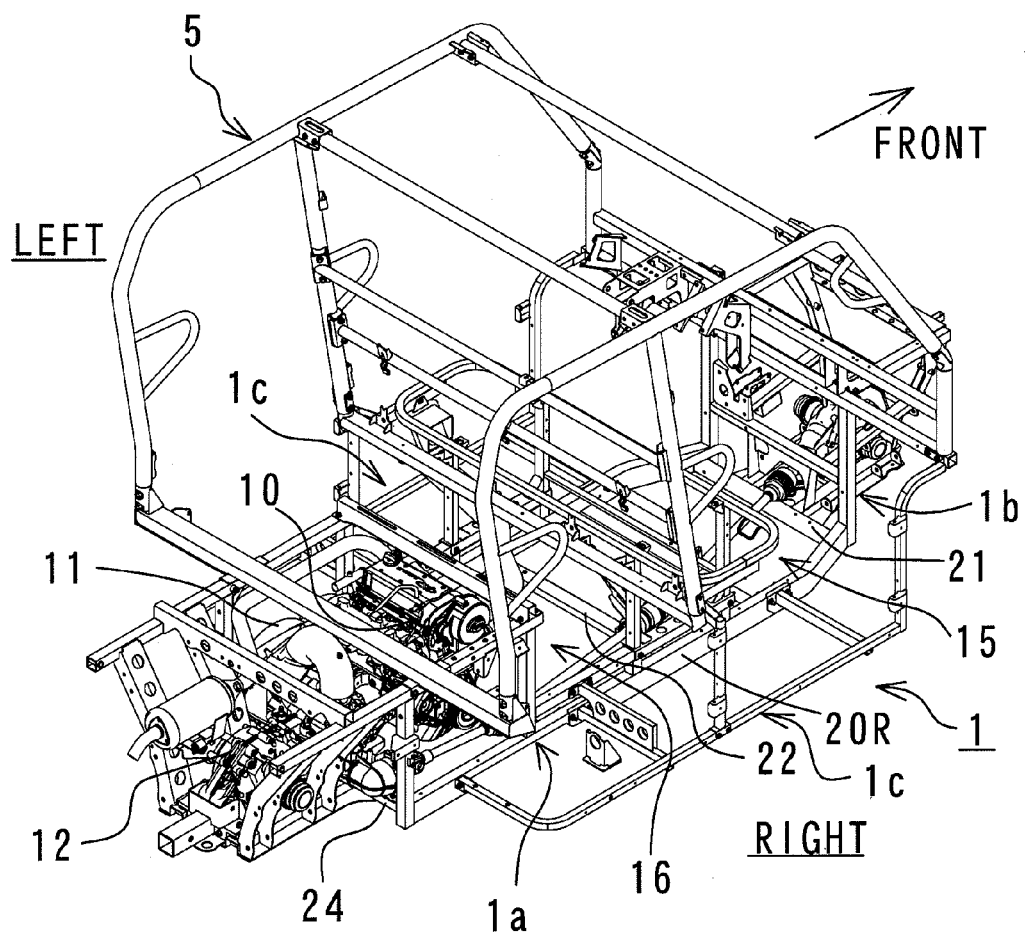
FIG. 2 is a perspective view of a body frame of the utility vehicle of FIG. 1.

In FIG. 2, the body frame 1 includes a rectangular main frame 1a elongated in the front and rear direction in a plan view, a bonnet formation frame 1b formed in a front end of the main frame 1a, and side frames 1c detachably fixed on both left and right sides of the main frame 1a, and is further integrated with the ROPS 5. The engine 10 and the gear type transmission 11 are arranged in a box part formed in a rear end of the main frame 1a.

Figure 3:
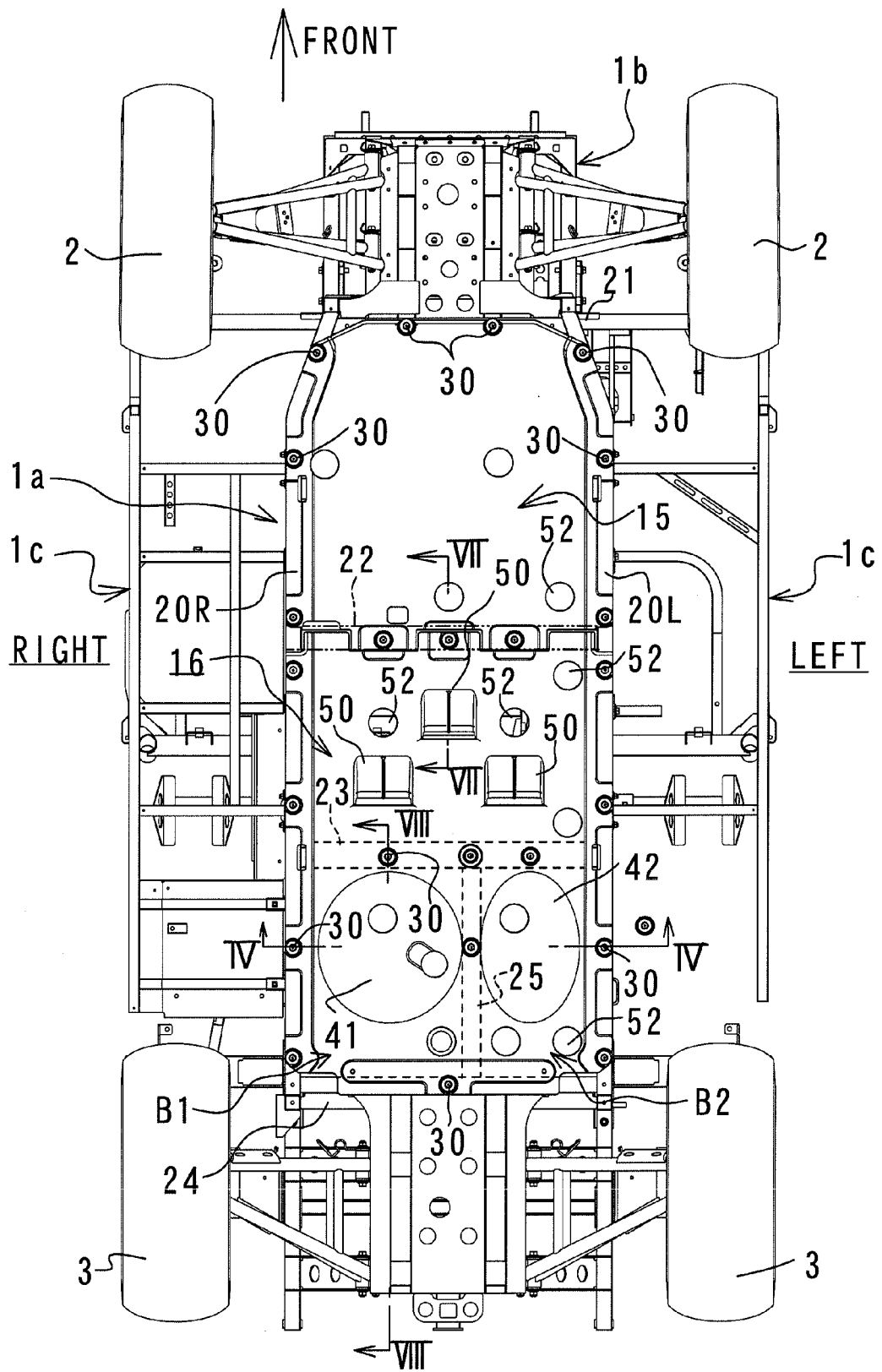
FIG. 3 is a bottom view of the utility vehicle of FIG. 1.

FIG. 3 is a bottom view of the utility vehicle, in which the left and right sides in the figure are expressed opposite to the actual left and right sides of the vehicle. A bottom part of the main frame 1a includes left and right bottom frame members 20L and 20R extending in the front and rear direction, a plurality of bottom cross members 21, 22, 23, and 34 for combining the left and right bottom frame members 20L and 20R, and the like. For easy understanding, the bottom cross members 21, 22, 23, and 24 will be referred to as the first bottom cross member 21, the second bottom cross member 22, the third bottom cross member 23, and the fourth bottom cross member 24 in order from front.

Between the third bottom cross member 23 and the fourth bottom cross member 24, a sub frame member 25 extending in the front and rear direction is arranged at a position displaced leftward with respect to a vehicle width center line. By the sub frame member 25, an intermediate part of the third bottom cross member 23 and an intermediate part of the fourth bottom cross member 24 are combined. In a region (B1+B2) surrounded by the left and right bottom frame members 20L and 20R, the third bottom cross member 23, and the fourth bottom cross member 24 in a plan view, the above engine 10 (FIG. 1) and a front half part of the V-belt transmission 12 (FIG. 1) are placed.

The front under cover 15 is made of resin, and arranged so as to cover a region surrounded by the left and right bottom frame members 20L and 20R, the first bottom cross member 21, and the second bottom cross member 22. An outer peripheral end of the front under cover 15 is fixed to the left and right bottom frame members 20L and 20R and the first and second bottom cross members 21 and 22 by a plurality of tapping screws 30.

The rear under cover 16 is also made of resin, and arranged so as to cover a region surrounded by the left and right bottom frame members 20L and 20R, the second bottom cross member 22, and the fourth bottom cross member 24. An outer peripheral end of the rear under cover 16 is fixed to the left and right bottom frame members 20L and 20R and the second and fourth bottom cross members 22 and 24 by a plurality of tapping screws 30. Further, a part of the rear under cover 16 corresponding to the third bottom cross member 23 and a part corresponding to the sub frame member 25 are also fixed to the third bottom cross member 23 and the sub frame member 25 by a plurality of tapping screws 30.

In a first region B1 surrounded by the right bottom frame member 20R, the sub frame member 25, and the third and fourth bottom cross members 23 and 24 among a region of a rear half part of the rear under cover 16, a first raised portion 41 formed in a substantially true circular shape in a plan view is formed, and the first raised portion 41 is raised upward. In a second region B2 surrounded by the left bottom frame member 20L, the sub frame member 25, and the third and fourth bottom cross members 23 and 24 among the region of the rear half part of the rear under cover 16, a second raised portion 42 formed in an oblong shape which is elongated in the front and rear direction in a plan view is formed, and the second raised portion 42 is raised upward.

Three ventilation holes 50 are formed in a front half part of the rear under cover 16 for taking in the air for cooling the engine from an exterior. One of these three ventilation holes 50 is arranged on the front side and the remaining two are arranged on the rear left and right sides, so that the ventilation holes are arranged in a triangle form. Further, a plurality of drain holes 52 for discharging water and mud is formed in the front under cover 15 and the rear under cover 16.

It should be noted that the reference signs are given only to a part of the above tapping screws 30 and the drain holes 52, and the reference signs are omitted for the remaining parts.

Figure 4:
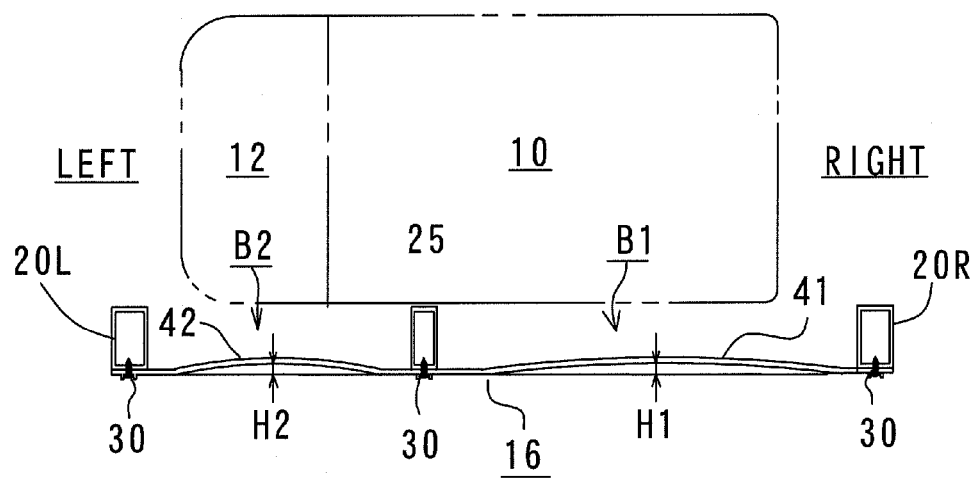
FIG. 4 is an enlarged sectional view by line IV-IV of FIG. 3.

In FIG. 4, a plate thickness of the rear under cover 16 is for example 5 mm. The first raised portion 41 protrudes upward in a partially spherical shape with respect to a planar part of the rear under cover 16, and a protruding height H1 of the first raised portion 41 is for example 3 mm. Since the first raised portion 41 is formed in a substantially partially spherical shape, any vertically sectional shape passing through the top of the spherical surface becomes the substantially same arc shape.

The second raised portion 42 of the rear under cover 16 protrudes upward in such a manner that a vertically sectional shape becomes an arch shape with respect to the planar part of the rear under cover 16, and a protruding height H2 of the second raised portion 42 is for example 3 mm. Since the second raised portion 42 is formed in an oblong shape elongated in the front and rear direction in a plan view, the vertically sectional shape along the vehicle width direction becomes an arch shape having the narrowest width, and the vertically sectional shape along the front and rear direction becomes an arch shape having the widest width.

Figure 6:
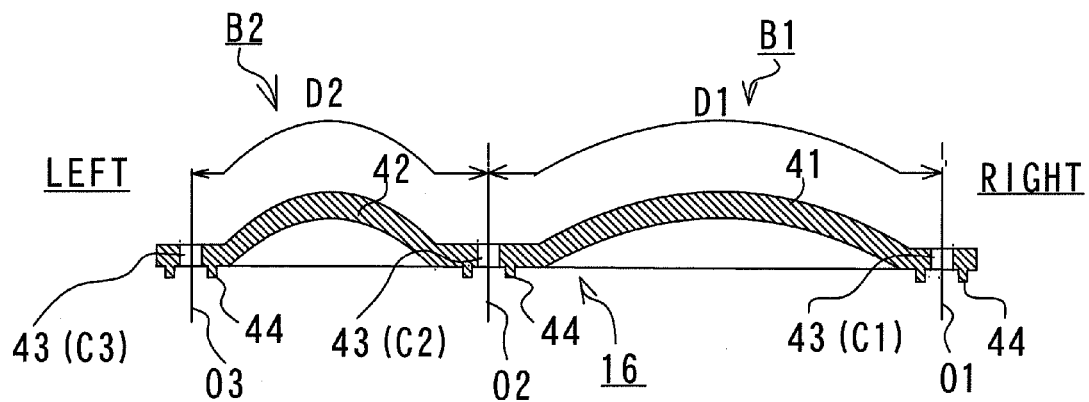
FIG. 6 is an enlarged sectional view of only the under cover of FIG. 5.

In FIG. 6, screw insertion holes 43 are respectively formed in both ends of the rear under cover 16 in the vehicle width direction and the planar part between both the raised portions 41 and 42. Around lower end openings of the screw insertion holes 43, annular ribs 44 respectively surrounding the lower end openings of the screw insertion holes 43 are integrated with the rear under cover 16.

An inner diameter of the screw insertion holes 43 is generally set so as to have a radial play with respect to an outer diameter of the tapping screws 30 (FIG. 5) from a view of manufacturing and assembling properties. However, in a case where there is the play as described above, depending on size of the play, there may be a situation that the rear under cover 16 is deformed so as to protrude downward in a case where the rear under cover 16 is expanded by heating. Thus, in the present embodiment, at the time of a normal temperature, surface lengths D1 and D2 in the vehicle width direction between center lines O1, O2, and O3 of the screw insertion holes 43 in a right end, a middle part, and a left end of the rear under cover 16 are set to be lengths obtained by adding the play to pitches P1 and P2 between center lines of the tapping screws of FIG. 5, or more.

Figure 5:
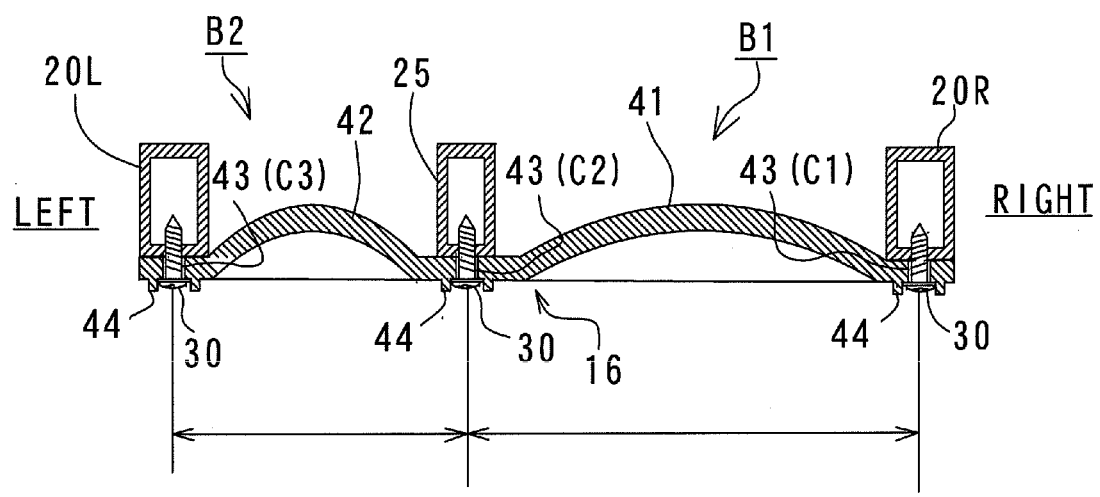
FIG. 5 is an enlarged sectional view exaggeratingly showing a thickness and a curve degree of an under cover of FIG. 4.

Specifically speaking, in FIG. 5, in a case where a play in the vehicle width direction between the screw insertion hole 43 in the right end and the tapping screw 30 inserted into this hole is C1, a play in the vehicle width direction between the screw insertion hole 43 in the middle in the vehicle width direction and the tapping screw 30 inserted into this hole is C2, and a play in the vehicle width direction between the screw insertion hole 43 in the left end and the tapping screw 30 inserted into this hole is C3, the surface lengths D1 and D2 are set in such a manner that D1>P1+C1+C2 and D2>P2+C2+C3.

In FIG. 6, the surface length D1 in the vehicle width direction of the first region B1 of the rear under cover 16 is a length measured from the center line O1 of the screw insertion hole 43 in the right end to the center line O2 of the screw insertion hole 43 in the middle part in the vehicle width direction along an arc surface of the first raised portion 41. The surface length D2 of the second region B2 is a surface length measured from the center line O2 of the screw insertion hole 43 in the middle part in the vehicle width direction to the center line O3 of the screw insertion hole 43 in the left end along an arch surface of the second raised portion 42. It should be noted that the same setting can be applied in the vehicle front and rear direction.

Figure 7:
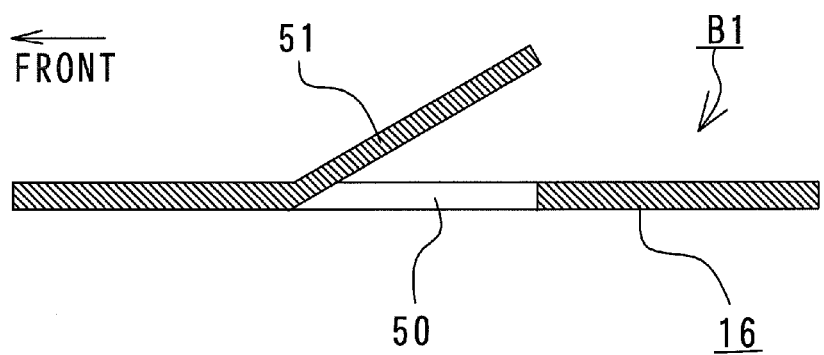
FIG. 7 is an enlarged sectional view by line VII-VII of FIG. 3.

FIG. 7 is an enlarged sectional view of the ventilation hole 50, and a ventilation guide 51 getting higher toward the rear side is integrated with the rear under cover 16 on the upper side of the ventilation hole 50.

Figure 8:
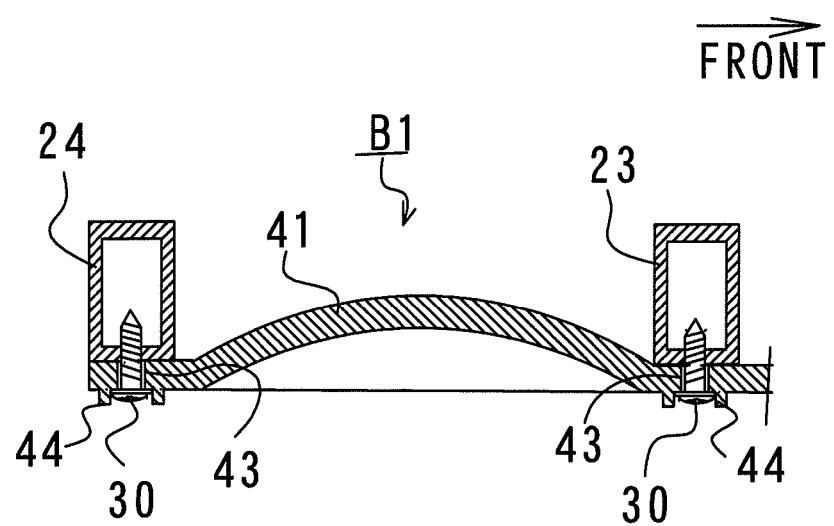
FIG. 8 is an enlarged sectional view by line VIII-VIII of FIG. 3.

FIG. 8 is a sectional view by line VIII-VIII of FIG. 3, elucidating that a vertical section along the front and rear direction of the first raised portion 41 is also formed in an arc shape.

(Operations and Effects of the Embodiment)

At the time of starting running of the vehicle, in a case where a temperature of the rear under cover 16 is not yet raised by radiation heat of the engine 10, as a matter of course, the rear under cover 16 is maintained in a normal shape in which the first and second raised portions 41 and 42 protrude upward as well as the time of manufacturing. By this rear under cover 16, the engine 10 and the like are protected from a scattering matter from the ground, and contact between an uneven road surface and the rear under cover 16 is also prevented.

Lower end head parts of the tapping screws 30 are prevented from contact with the uneven road surface by the annular ribs 44 surrounding the parts.

Further, since the air (running air) is taken into an upper space of the rear under cover 16 from the ventilation holes 50 formed in the rear under cover 16, the engine 10 is cooled.

When the temperature of the first and second regions B1 and B2 of the rear under cover 16 is increased by the radiation heat of the engine 10 by continuing running of the vehicle, the rear under cover 16 is softened and expanded in the horizontal direction. In the vehicle width direction, after the first and second regions B1, and B2 of the rear under cover 16 are expanded in the vehicle width direction by an amount relevant to the corresponding plays (C1+C2, C2+C3), expansion in the vehicle width direction is hindered by abutment between inner peripheral edges of the screw insertion holes 43 and the tapping screws 30. Therefore, deformation in the vehicle width direction by thermal expansion is operated in such a manner that the first raised portion 41 and the second raised portion 42 are pushed up from both the ends in the vehicle width direction. Thus, the rear under cover 16 is not sagging and the contact between the uneven road surface and the rear under cover 16 is also prevented.

Since the vertically sectional shapes of the first and second raised portions 41 and 42 are formed in an arch shape or an arc shape, even upon thermal expansion, the portions are entirely uniformly and smoothly expanded (deformed) upward. Thus, durability is improved.

Other Embodiments

Although the front and rear under covers of the above embodiment are made of resin, the under covers may be made of sheet metal.

As a means for fixing the under covers to the body frame, bolts and nuts can also be utilized instead of the tapping screws.

The first and second raised portions of the above embodiment are formed in a circular shape or an oblong shape in a plan view. However, the portions may also be formed in a polygonal shape in a plan view.

In the utility vehicle of the above embodiment, the engine (internal combustion engine) is mounted as the source of power. However, the present invention can also be applied to a utility vehicle in which an electric motor is mounted.

The present invention is not limited to the structure of the above embodiment but includes various modified examples considered within a range not departing from the content described in the claims.

What is claimed is:

1. A utility vehicle comprising:
   a body frame;
   a source of power arranged in the body frame; and
   an undercover for covering a lower surface of the body frame, the undercover having a region which directly faces the source of power from a lower side,
   wherein both ends of the undercover in the vehicle width direction or the vehicle front and rear direction are fixed to lower surfaces of a plurality of bottom frame members forming a bottom part of the body frame,
   and wherein the region of the undercover is raised upward, and a space is provided between the source of power and the region of the undercover which directly faces the source of power such that the region of the undercover deforms upwardly upon being heated.

2. The utility vehicle according to claim 1, wherein the raised region has a vertically sectional shape along the vehicle width direction formed in an arch shape.

3. The utility vehicle according to claim 1, wherein the raised region has a vertically sectional shape along the vehicle front and rear direction formed in an arch shape.

4. The utility vehicle according to claim 1, wherein the raised region has vertically sectional shapes along the vehicle width direction and the vehicle front and rear direction both formed in an arch shape.

5. The utility vehicle according to claim 1, wherein the raised region is formed in a partially spherical shape.

6. The utility vehicle according to claim 1, wherein the raised region is formed in a circular shape or an oblong shape when seen from an upper side.

7. The utility vehicle according to claim 1, wherein the undercover has a plurality of screw insertion holes at both ends of the undercover in the vehicle width direction or the vehicle front and rear direction, and is fixed to the lower surfaces of the bottom frame members by fasteners inserted through the screw insertion holes and fastened,
   wherein an inner diameter of each screw insertion hole is sized so as to have a radial play with respect to an outer diameter of one of the fasteners,
   and wherein, at a time prior to heating of the undercover, surface lengths measured along the surface of the undercover in the vehicle width direction or the vehicle front and rear direction between center lines of the screw insertion holes and over the region of the undercover which directly faces the source of power are set to be greater than or equal to lengths obtained by adding the radial play to a linear distance between the center lines of the screw insertion holes.

* * * * *